United States Patent [19]

Heid et al.

[11] Patent Number: 5,514,051
[45] Date of Patent: May 7, 1996

[54] METHOD AND AN ARRANGEMENT FOR CONTROLLING AN AUTOMATIC TRANSMISSION

[75] Inventors: Gerhard Heid, Leonberg; Willi Seidel, Eberdingen, both of Germany

[73] Assignee: Dr. Ing. h.c.F. Porsche AG, Weissach, Germany

[21] Appl. No.: 276,827

[22] Filed: Jul. 18, 1994

[30] Foreign Application Priority Data

Jul. 17, 1993 [DE] Germany .......................... 43 24 091.7

[51] Int. Cl.$^6$ .................... F16H 59/66; F16H 59/36; F16H 59/14; B60K 41/04
[52] U.S. Cl. ........................................... 477/120; 477/904
[58] Field of Search ..................... 477/120, 904

[56] References Cited

U.S. PATENT DOCUMENTS

| | | | |
|---|---|---|---|
| 5,129,288 | 7/1992 | Sasaki et al. | 477/120 |
| 5,157,609 | 10/1992 | Stehle et al. | 477/120 |
| 5,178,044 | 1/1993 | Suzuki et al. | |
| 5,231,582 | 7/1993 | Takahashi et al. | 477/120 |
| 5,319,555 | 6/1994 | Iwaki et al. | 477/120 |
| 5,361,207 | 11/1994 | Hayafune | 477/120 |

FOREIGN PATENT DOCUMENTS

| | | |
|---|---|---|
| 0471102A1 | 2/1992 | European Pat. Off. . |
| 0532365A2 | 3/1993 | European Pat. Off. . |
| 0537811A1 | 4/1993 | European Pat. Off. . |
| 2001941 | 10/1970 | Germany . |
| 2852195C2 | 6/1980 | Germany . |
| 3018032C2 | 11/1981 | Germany . |
| 3922051A1 | 1/1991 | Germany . |

OTHER PUBLICATIONS

German Publication DE-Z *Automobiltechnische Zeitschrift*, vol. 9/1992, pp. 428–436.

Winfried Oppelt; Kleines Handbuch technischer Regelvorgaenge, Auflage 1964, Verlag Chemie GmbH, Weinhelm/Bergstrasse.

*Primary Examiner*—Dirk Wright
*Attorney, Agent, or Firm*—Evenson, McKeown, Edwards & Lenahan

[57] ABSTRACT

A method and an arrangement for controlling an automatic transmission of a motor vehicle driven by an internal-combustion engine, in which the position of a throttle valve of the motor vehicle and the acceleration of the vehicle as the reaction thereto are determined and are related to one another. Subsequently, this relationship is compared with the relationship as it occurs during a normal drive on a level surface. As a function of the deviation between the actual relationship and the normal relationship, the ratios of the transmission are displaced in the direction of higher rotational engine speeds, which means that the ratio assigned to a throttle valve position and to a rotational engine speed will now be achieved at a lower rotational engine speed, or the rotational engine speed level is raised. For a stepped transmission, several characteristic shifting diagrams are provided and the displacement of the ratio is carried out by changing the characteristic shifting diagram according to the deviation. For a continuous transmission, which has several characteristic control curves, the displacement of the ratio is carried out by a change of the characteristic control curve according to the ratio.

10 Claims, 3 Drawing Sheets

METHOD AND AN ARRANGEMENT FOR CONTROLLING AN AUTOMATIC TRANSMISSION

BACKGROUND OF THE INVENTION

The present invention relates to a method and arrangement for controlling an automatic transmission of a motor vehicle driven by means of an internal-combustion engine, the internal-combustion engine being influenceable by a power control element, preferably an accelerator pedal or a throttle valve, and ratios of the transmission are automatically selected at least as a function of the position of the power control element and of the rotational engine speed.

As a rule, automatically shifting, stepped transmissions determine the transmission gear which is to be engaged from the position of the throttle valve and the rotational speed of the engine by means of characteristic shifting diagrams. The characteristic shifting curves at which a gear is changed and which are contained in the characteristic shifting diagrams are displaced in known further developments of transmissions of this type as a function of various parameters. Thus, it is known, for example, from German Patent Document DE 39 22 051 A1 to change between different characteristic shifting diagrams as a function of a driver's vehicle handling or his actions based on the traffic situation and to thus displace the characteristic shifting curves.

Also, from German publication DE-Z *Automobiltechnische Zeitschrift*, Volume 9/1992, Pages 428 to 436, it is known to recognize by means of a so-called "road resistance monitoring", also increased road resistances and to call a hill/trailer shifting program as a function thereof. For this purpose, the acceleration when driving with a normal load on a level surface is estimated from the actual engine operating condition. If the actual acceleration is below the thus determined value, the above-mentioned special shifting program is called in which the vehicle is operated at high rotational speeds of the engine.

An object of the invention is to provide a method and an arrangement for controlling an automatically shifting transmission which recognizes all types of road resistance changes and reacts to them as a function of the recognized road resistance.

This and other objects are achieved by the present invention which provides a method for controlling an automatic transmission of a motor vehicle driven by an internal-combustion engine, the internal-combustion engine being influenceable by a power control element, with ratios of the transmission being automatically selected at least as a function of a position of the power control element and of a rotational engine speed, the method comprising the steps of: determining a reaction of the vehicle to the position of the power control element; relating the position of the power control element and a reaction of the vehicle thereto to one another to form a first relationship; determining a deviation of the first relationship from a relationship existing during normal driving of the vehicle on a level surface; and displacing the ratios of the transmission toward higher rotational engine speeds as a function of the deviation. The objects are also achieved by another embodiment of the invention which provides an arrangement for controlling an automatic transmission of a motor vehicle driven by means of an internal-combustion engine, comprising: a first generator that determines a position of a power control element of the internal-combustion engine; a second generator that determines a rotational engine speed of the internal-combustion engine and at least one characteristic shifting diagram for automatic determination of a ratio of a transmission connected behind the internal-combustion engine from the signals of the second generator; a third generator that determines a reaction of the vehicle to the position of the power control element; a first comparator coupled to the first and third generators and that relates the signal for the position of the power control element to the signal for the reaction of the vehicle thereto; a second comparator coupled to the first comparator that determines a deviation of the signal of the first comparator from a signal of the first comparator which exists during a normal drive on a level surface; and a displacing device which acts upon the characteristic shifting diagram to displace the ratios in the direction of higher rotational engine speeds as a function of the deviation.

The objects are also achieved by another embodiment of he present invention which provides an arrangement for controlling an automatically shifting stepped transmission of a motor vehicle driven by an internal-combustion engine, comprising: a first generator that determines a position of a power control element of the internal-combustion engine; a second generator that determines rotational engine speed of the internal-combustion engine; a plurality of characteristic shifting diagrams which cover a range between a consumption-optimal and a power-optimal operation of the internal-combustion engine and by which, at least as a function of the position of the power control element and of the rotational engine speed, ratios are automatically selected, said plurality of characteristic shifting diagrams differing in the position of the characteristic shifting curves at which a change of the ratio takes place; means for determining the relationship of the position of the power control element to the reaction of the vehicle, said means including several characteristic diagrams of which one is used, in accordance with the adjusted ratio, for determination of an intermediate quantity as a function of a change of the vehicle speed and the position of the power control element, means for multiplying the intermediate quantity with a factor which is a function of the driving speed and which continuously reduces the value of the intermediate quantity as the driving speed increases; a first order delay line or so-called PT-1 filter that filters said intermediate quantity; and means for selecting, for the displacement of the ratio, the characteristic shifting diagram to be used according to the filtered intermediate quantity, such that with an increasing intermediate quantity characteristic shifting diagrams are selected which increasingly cover the power-optimal operation.

The objects are achieved by still another embodiment of the present invention which provides an arrangement for controlling an automatically shifting continuous transmission of a motor vehicle driven by an internal-combustion engine, comprising: a first generator for determining the position of a power control element of the internal-combustion engine;

a second generator for determining the rotational engine speed of the internal-combustion engine; a plurality of characteristic shifting diagrams which cover a range between a consumption-optimal and a power-optimal operation of the internal-combustion engine and by which, at least as a function of the position of the power control element and of the rotational engine speed, ratios are automatically selected; means for determining a relationship of the position of the power control element to the reaction of the vehicle, said means including several characteristic diagrams of which one is used, in accordance with the adjusted ratio, for determination of an intermediate quantity as a function of a change of the vehicle speed and the position of the power control element; means for multiplying the intermediate quantity with a factor which is a function of the driving speed and which continuously reduces the value of the intermediate quantity as the driving speed increases; a PT-1 or delay line filter which filters said intermediate quantity; and means for selecting, for the displacement of the ratio, the characteristic control curve to be used according to the filtered intermediate quantity, such that with an increasing intermediate quantity characteristic control curves are selected which increasingly cover the power-optimal operation.

By means of the invention, it is advantageously achieved that reductions of the road resistance, such as driving downhill, as well as increases of the road resistance, such as driving uphill or operating a trailer, are recognized by a single method. In contrast to the state of the art, when road resistances are changed, no fixed special shifting program is called but an engine power is adjusted which is adapted to the existing conditions. Finally, the method according to the invention may be used for all types of transmission; that is, particularly for stepped automatic transmissions as well as for continuous automatic transmissions.

In certain embodiments of the invention, by means of the vehicle acceleration, the reaction of the vehicle is detected which is expected by the driver upon his power demand specified by the position of the power control element. As a result, the invention can largely use known devices and sensors of the vehicle which, as a rule, already exist and can therefore be implemented in a cost-effective and simple manner.

In certain embodiments, the displacement of the ratios are proportioned with respect to the amount and speed according to the determined deviation and the displacement is carried out according to a first order delay or so-called PT1-action. As a result, the power of the engine is particularly well adapted to the difference between the power demand, represented by the position of the power control element, and the power output, that is, the reaction of the vehicle. In the event of small deviations, the ratios are displaced only a little. When the deviation continues to exist, the ratios are slowly displaced further. In contrast, in the case of large deviations, the ratios are displaced immediately and rapidly by large amounts.

The arrangement according to the invention also has all advantages of the method according to the invention. Furthermore, it is distinguished by the simple as well as effective use of a characteristic diagram for representing the comparison between the position of the power control element and the reaction of the vehicle thereto, as well as for determining the deviation of this relationship from the normal relationship. This, in turn, is possible in a particularly simple manner where characteristic diagrams are used anyhow for the changing of the characteristic shifting curves. In this case, no characteristic diagram must be supplemented but as a rule an already existing characteristic diagram must only be modified.

The displacement of the ratio which, as mentioned above, results in an increase of the rotational speed level of the engine, may in the simplest case be implemented as a manipulation of the rotational engine speed used for the determination of the ratio to be adjusted. In this case, the rotational engine speed signal is increased by a proportion which is a function of the deviation and, as a result, a ratio is adjusted which was originally provided as really existing for a higher rotational engine speed. For a stepped transmission, certain embodiments provide several characteristic shifting diagrams and carry out the displacement of the ratio by changing the characteristic shifting diagram according to the deviation. For a continuous transmission which has several characteristic control curves, in certain embodiments the displacement of the ratio is carried out by changing the characteristic control curve according to the ratio. In the case of continuous transmissions, the interpolations may naturally also take place by the deviation between two characteristic control curves, specifically a consumption-optimal characteristic control curve and a power-optimal characteristic control curve.

Other objects, advantages and novel features of the present invention will become apparent from the following detailed description of the invention when considered in conjunction with the accompanying drawing

DETAILED DESCRIPTION OF THE DRAWINGS

Figure 3:
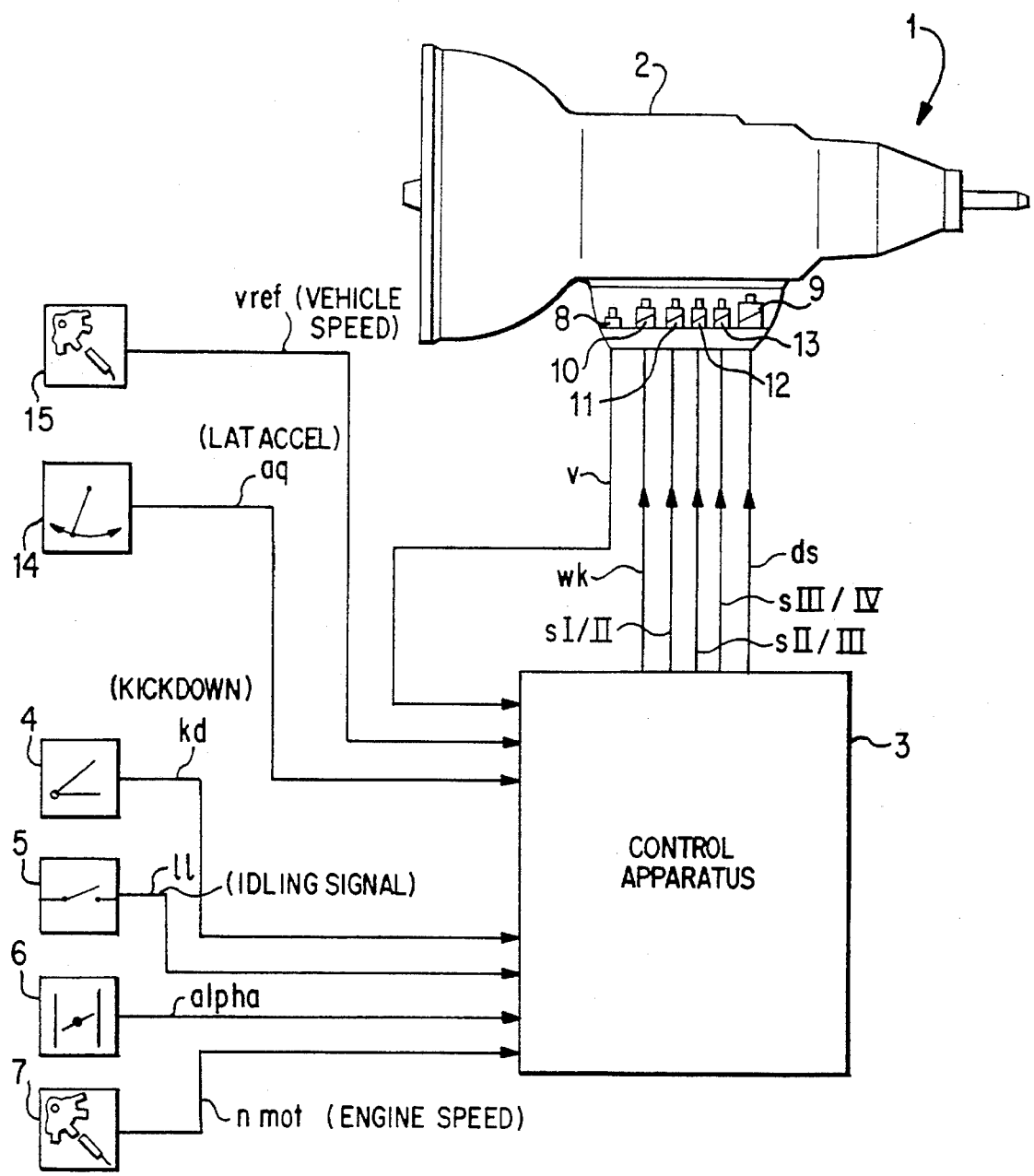
FIG. 3 is a block diagram of an electrohydraulic control system for a transmission of a motor vehicle.

Referring to FIG. 3, the embodiment of the present invention is based on an electrohydraulic control of an automatically shifting motor vehicle transmission, such as shown in German Patent Document DE 39 22 051 A1, corresponding to U.S. Pat. No. 5,157,609. This control detects by means of suitable generators 6, 7, 8, 14, the quantities throttle valve angle alpha(t), rotational engine speed nmot(t), driving speed v(t) and lateral acceleration aq(t). After the detection, these values are filtered in filters 16 to 20 and are subsequently supplied to five characteristic diagrams 21 to 25. As a rule, these characteristic diagrams also depend on still another input quantity. Thus, in addition to the throttle valve angle alpha(t), the vehicle speed change dv(t)/dt is also entered into the first characteristic diagram. In addition to the rotational engine speed nmot, an engaged gear position g is also entered into the second characteristic diagram 22. In addition to the input quantities lateral acceleration aq(t), longitudinal acceleration alb(t) and longitudinal deceleration alv(t), the driving speed v(t) is also entered into the characteristic diagrams 23 to 25 which follow.

The five characteristic diagrams 21 to 25 furnish five primary parameters SKP1(t) to SKP5(t) from which a secondary parameter SKS(t) is obtained and stored in a linking function 26. In the illustrated embodiment, the linking function 26 is implemented as a maximal value selection. From this secondary parameter SKS(t), in a filter 27 with a PT1-action, a first order delay or so-called first driving activity signal SK1(t) will then be generated in that the actual value of the secondary parameter SKS(t) and the value of the first driving activity SK1(t-T1) which was determined and stored one calculating period T1 earlier, are combined to a weighted sum. The first driving activity SK1(t) will now be used in a sixth characteristic diagram 28 for the selection of a shifting program SKFj. In the illustrated exemplary embodiment, five shifting programs SKF1 to SKF5 are provided which each, while a defined shifting hysteresis is taken into account, are assigned to value ranges of the first driving activity SK1(t). In this case, consumption-optimized shifting programs SKFj are assigned to small values of the driving activity SKI(t), and power-optimized shifting programs SKFj are assigned to higher values of the driving activity SK1(t).

In principle, this control operates as follows: Starting out from the zero value for the first driving activity SK1(t) and the corresponding consumption-optimal shifting program SKF1, it is tested whether one of the more power-optimized shifting programs SKF2 to SKF5 is to be selected. For this purpose, the input quantities in the five characteristic diagrams 21 to 25 are edited such that the values of the primary parameters SKP1(t) to SKP5(t) rise when the input quantities suggest a more power-optimized characteristic shifting diagram. By means of the linking function 26, the primary parameter SKPj(t) will then be selected which has assumed the highest value and is subsequently used as a secondary parameter SKS(t) for forming the first driving activity SKI(t). By means of the PT1-action of the first order delay or so-called filter 27, the influence of the secondary parameter SKS(t) is delayed with respect to the time.

Concerning detailed information on the construction and method of operation of the control, reference is made at this point to German Patent Document DE 39 22 051 A1, having a corresponding U.S. patent, U.S. Pat. No. 5,157,609, the specification of the U.S. Pat. No. 5,157,609 patent being herein expressly incorporated by reference.

Figure 1:
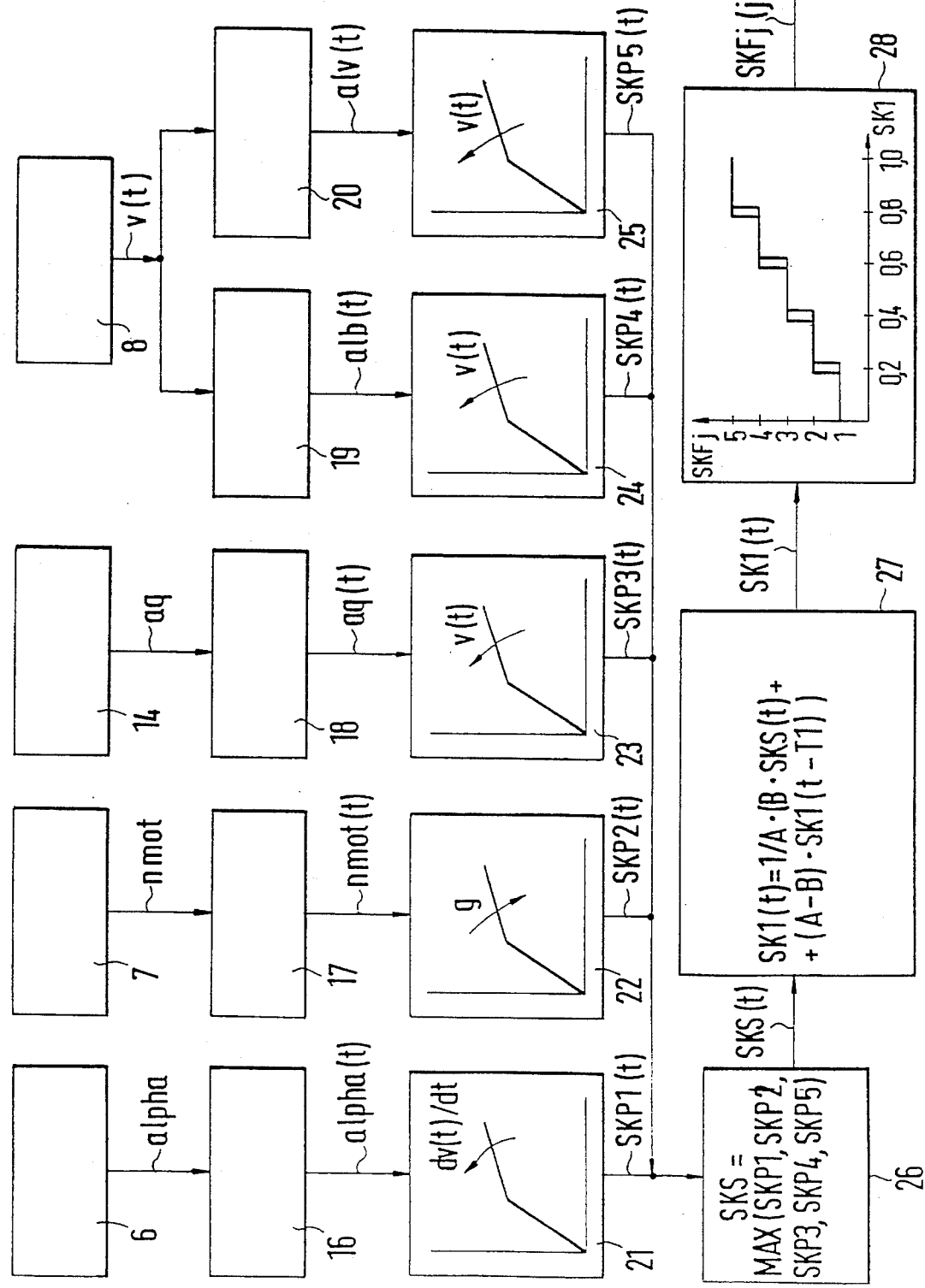
FIG. 1 is a schematic representation of a control method according to the present invention for selecting a characteristic shifting diagram for an automatically shifting transmission.
Figure 2:
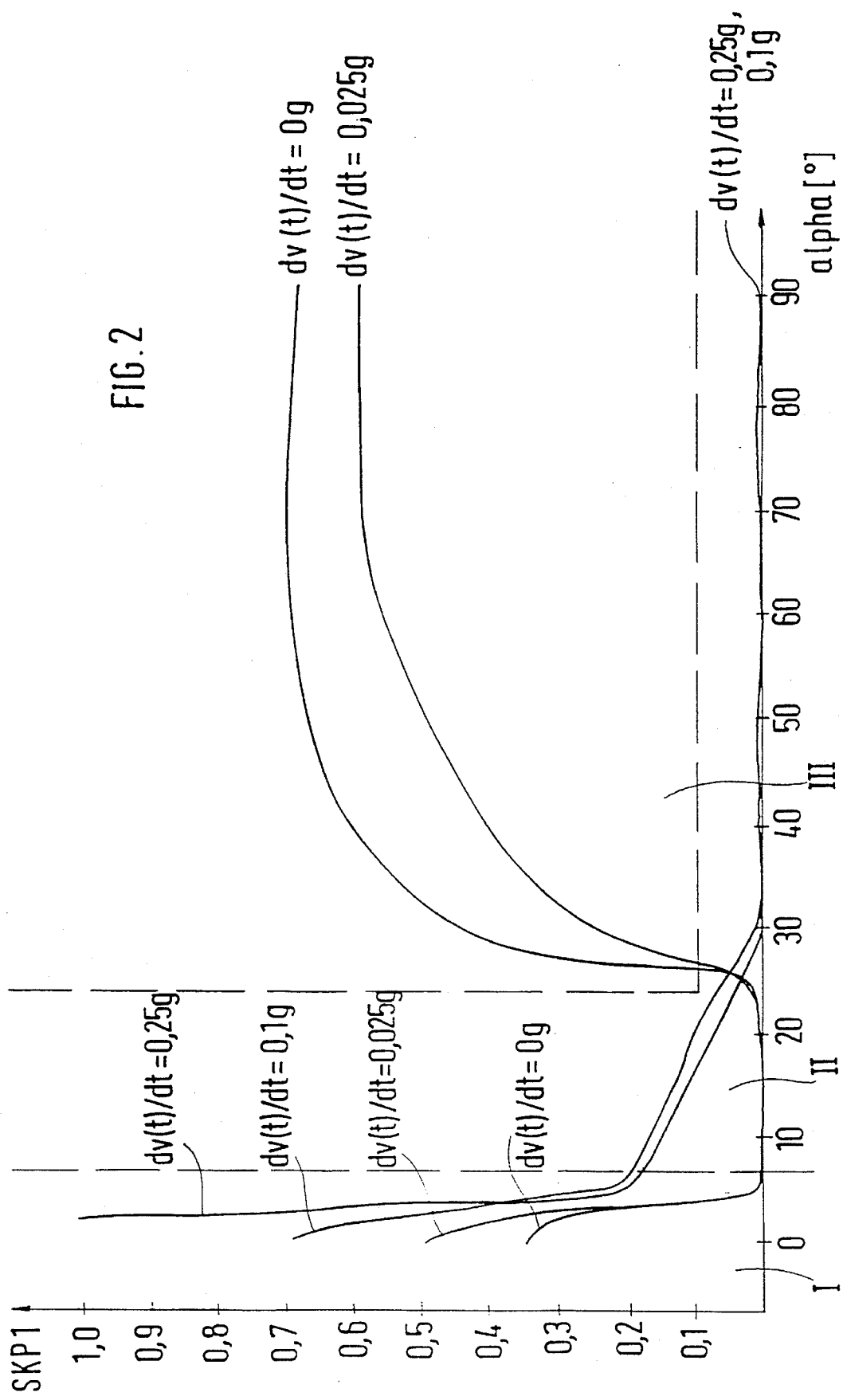
FIG. 2 is a characteristic diagram for the taking into account of road resistances.

Deviating from the control illustrated there, the first characteristic diagram SKP1(t) is constructed as illustrated in FIG. 2. This characteristic diagram shows the dependence of the first primary parameter SKP1(t) on the throttle valve angle alpha(t) and the change of the driving speed dv(t)/dt. The characteristic diagram is divided into three areas. In area I, a reduced road resistance is recognized, as occurs, for example, during downhill driving; in area II, normal operation is recognized and in area III, an increased road resistance is recognized, as occurs, for example, when driving uphill. In principle, it is determined by means of the illustrated first characteristic diagram whether there is a corresponding reaction of the vehicle in the form of a change of the driving speed to the adjusted throttle valve angle alpha (t), that is, the power demand by the driver.

Area II is the normal range; that is, here the relationship of the throttle valve angle alpha (t) to the vehicle speed change dv(t)/dt corresponds to a normal relationship. In this area, the values of the primary parameter SKP1(t) are small so that the first primary parameter SKP1(t), because of the maximal value selection in the linking function 26, will have no significant influence on the secondary parameter SKS(t) and selects the consumption-optimal shifting program SKF1. In addition, this area is designed such that city traffic and very smooth driving are also detected because, also in this case, a change to the more power-optimized shifting programs SKF2 to SKF5 is not required. Thus, area II extends over all values of the throttle valve angle alpha(t) and here assigns such values to the first primary parameter SKP1(t) which are assigned to the consumption-optimal shifting program SKF1. In the present case, the area of very small throttle valve angles of under 7° is excluded as the coasting area. The fact that area II extends over all values of the first primary parameter SKP1(t) in the area of the throttle valve angle alpha(t) of 7° to 24° has the purpose of indicating that in this area the value for the first primary parameter SKP1(t) is selected such that the consumption-optimal shifting program SKF1 is reached. On the whole, in area II, the values of the first primary parameter SKP1(t) are comparatively small so that the first primary parameter SKP1(t) has no significant influence on whether the secondary parameter SKS(t) or the consumption-optimal shifting program SKF1 is reached.

Area I for reduced road resistance comprises mainly small throttle valve angles alpha(t) below approximately 7° and therefore, as a rule, indicates the coasting operation. Also, in the case of a vehicle which rolls in neutral with a change of the driving speed dv(t)/dt=0, the value of the primary parameter SKP1(t) rises here with a falling throttle valve angle alpha(t) in order to select the second characteristic shifting diagram SKF2 and therefore to be able to again accelerate sufficiently after the coasting stage, or the braking effect of the engine during coasting may be increased. When, in area I, the change of the driving speed dv(t)/dt reaches higher values, such as 2.5 m/s², the vehicle will accelerate to a comparatively large extent, despite the fact that the throttle valve is almost closed, so that a gradient or similar structure has to be used as the basis. In this case, the primary parameter SKP(1) reaches high values up to 1 in order to in this manner rapidly select the most sporty characteristic shifting diagram SKF5 and thus rapidly cause a downshift by one or several gears.

Area III, which is reached in the event of an increased road resistance, comprises the higher values of the throttle valve angle alpha(t); here, above 24°. In this area, smaller values of the driving speed change dv(t)/dt are in the range below approximately 0.05 m/s². As the value of the driving speed change dv(t)/dt rises, the value of the first primary parameter SKP1(t) will fall since, as a result, the vehicle reaction will correspond more and more to the power demand in the form of the throttle valve angle alpha(t) until finally, at the driving speed change dv(t)/dt above approximately 0.05 m/s², area III will be left. The first primary parameter SKP1 (t) will reach its highest value at a driving speed change dr(t)/dt of 0 m/s². This value is selected such that the fourth shifting program SKF4 is just reached. The general rule is that, while the change of the vehicle speed dv(t)/dt remains uniformly small, the value of the primary parameter SKP1 (t) also rises as the throttle valve angle alpha (t) increases.

It is a general rule for the whole characteristic diagram that the area between the described values is covered continuously, for example, by means of interpolation. The characteristic diagram is constructed as a function of the gear or the gear ratio; i.e., a separate characteristic diagram is provided for each transmission gear or for each ratio. This takes into account the ratio-dependent acceleration capacity of the vehicle. Furthermore, the first primary parameter SKP1(t) will still be modified by multiplication with a driving-speed-dependent factor in order to also detect the influence of the driving speed v(t) on the acceleration capacity. Otherwise, for example, during a fast drive on a highway with a throttle valve angle alpha(t) of 70° and a constant speed, the fourth, power-optimal shifting program SKF4 would always be reached, and the fuel consumption of the vehicle would be raised unnecessarily. The driving-speed-dependent factor therefore modifies the value of the first primary parameter SKP1(t) in such a manner that the value of the first primary parameter SKP1(t) falls as the driving speed increases.

As a result of the first order of delay or so-called PT1-action of the filter 27, the amount of the primary parameter SKP1(t) is of considerable importance for the time until there is a downshift or until there is a change of the characteristic shifting diagram SKFj. In the present case, a time constant of 25 seconds is selected; i.e., the output of the filter 27, after a signal is applied to the input, will reach 63% of the input signal value after 25 seconds. Since a value range of between approximately 0.8 to 1.0 of the first driving activity SK1(t) is assigned, for example, to the fifth characteristic shifting diagram SKF5 in characteristic diagram 28, this fifth characteristic shifting diagram SKF5 can be reached by means of values of the secondary parameter SKS(t) between 0.8 and 1. The fifth characteristic shifting diagram SKF5 will be selected as soon as the first driving activity SK1(t) exceeds the value 0.8. When the value of the secondary parameter SKS(t) is a little larger than 0.8, this takes place only after several minutes, while, when a value of the secondary parameter SKS(t) is 1, this occurs after a few seconds. In the present example, a change over two characteristic diagrams with the minimal value of the secondary parameter SKS(t) by means of which this change is possible, lasts 160 seconds, while only 20 seconds are required by means of the maximal value of the secondary parameter SKS(t).

The time variation of the filter 27 influences the vehicle handling such that small deviations between the power demand expressed by the throttle valve angle alpha(t) and the change of the driving speed dv(t)/dt have a slow and minor effect, while large deviations lead to fast jumps through the characteristic shifting diagrams SKFj.

The described method may be used for all controls of automatically shifting transmissions, including continuous transmissions. When the method of the present invention is used for a transmission with only one characteristic shifting diagram SKF, the displacement of the ratio may be carried out as a manipulation of the rotational engine speed nmot (t) used for the determination of the ratio to be adjusted. In this case, the rotational engine speed signal nmot(t) is increased by a proportion which is a function of the primary parameter SKP1(t) and thus a ratio is adjusted which was originally provided as actually existing for a higher rotational engine speed nmot(t).

When two characteristic shifting diagrams SKFj are provided, by means of this method, a strategy can be obtained for the change-over to the more power-optimized characteristic shifting field SKFj, in that the value of the primary parameter SKP1 is compared with a limit value and an exceeding of this limit value leads to the change into the power-optimized shifting program SKFj. In this case, important characteristics of the method are maintained, such as the recognition of uphill and downhill driving and a time-delayed change-over depending on the amount of the deviation between the power demand and the reaction of the vehicle. For use in vehicles with several characteristic shifting diagrams, the primary parameter SKP1(t) can be used in the described manner for the selection of the characteristic shifting diagram.

An arrangement which is suitable for the invention but is not shown in detail receives on the input side at least signals of a generator for the detection of the throttle valve angle alpha(t) and of a generator for the detection of the rotational engine speed nmot(t). The arrangement comprises at least one characteristic curve for the determination of a ratio from these signals and controls the transmission in such a manner that this ratio is adjusted. A generator for the detection of the driving speed v(t) supplies a signal to a differentiator so that a signal is obtained for the change of the driving speed dv(t)/dt. In a first comparator, this signal dv(t)/dt is related to the throttle valve angle signal alpha(t) and is subsequently compared in a second comparator with a value which is a function of the adjusted ratio and the driving speed signal v(t). The deviation obtained during this comparison is filtered in a first order delay or so-called PT1-element and is subsequently detected by the control unit which, as a function thereof, displaces the characteristic curve in the direction of higher rotational engine speeds nmot(t).

As in the shown example, as an alternative, both comparators may be represented by the characteristic diagram 27 which determines from the change of the driving speed v(t) and the throttle valve angle alpha(t), an intermediate quantity, and the characteristic diagram 27 itself is selected as a function of the adjusted ratio, for example, by a separate characteristic diagram for each transmission gear of a stepped transmission. The intermediate amount will then be modified by means of the driving speed v(t) such that it decreases as the driving speed increases. By the form of the assignment (the characteristic curve in characteristic diagram 27), the power demand, specifically the throttle valve angle alpha(t), is compared with the reaction of the vehicle, specifically the change of the driving speed dv(t)/dt, and, at the same time, the comparison with the normal relationship is carried out. The dependence of this normal relationship on the acceleration capacity which is a function of the ratio adjusted in the transmission and of the driving speed in this case takes place via the characteristic diagrams which depend on the ratio and the modification of the intermediate quantity, which follows, by means of the driving speed. Naturally, this can also be illustrated by means of a multi-dimensional characteristic diagram which determines the intermediate quantity from all four input quantities—change of the driving speed dv(t)/dt, throttle valve angle alpha(t), driving speed v(t), and adjusted ratio.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for controlling an automatic transmission of a motor vehicle driven by an internal-combustion engine, the internal-combustion engine being influenceable by a power control element, with ratios of the transmission being automatically selected at least as a function of a position of the power control element and of a rotational engine speed, the method comprising the steps of:

determining a reaction of the vehicle to the position of the power control element;

relating the position of the power control element and a reaction of the vehicle thereto to one another to form a first relationship;

determining a deviation of the first relationship from a relationship existing during normal driving of the vehicle on a level surface in a sense of an exceeding and a falling-below said normal driving relationship; and displacing the ratios of the transmission as a function of the deviation so as to result in higher rotational engine speeds.

2. A method according to claim 1, wherein the step of determining the reaction of the vehicle includes the step of detecting a change of a vehicle speed.

3. A method according to claim 1, wherein the step of displacing the ratio increases with respect to the amount and the speed with the deviation and is carried out according to a first order delay.

4. An arrangement for controlling an automatic transmission of a motor vehicle driven by means of an internal-combustion engine, comprising:

a first generator that determines a position of a power control element of the internal-combustion engine;

a second generator that determines a rotational engine speed of the internal-combustion engine and at least one characteristic shifting diagram for automatic determination of a ratio of a transmission connected behind the internal-combustion engine from the signals of the second generator;

a third generator that determines a reaction of the vehicle to the position of the power control element;

a first comparator coupled to the first and third generators and that relates the signal for the position of the power control element to the signal for the reaction of the vehicle thereto;

a second comparator coupled to the first comparator that determines a deviation of the signal of the first comparator from a signal of the first comparator which exists during a normal drive on a level surface in a sense of an exceeding and a falling-below said signal existing during the normal drive; and a displacing device which acts upon the characteristic shifting diagram to displace the ratios as a function of the deviation so as to result in higher rotational engine speeds.

5. An arrangement according to claim 4, wherein the third generator is a generator for the vehicle speed comprising a differentiator which is connected behind it.

6. An arrangement according to claim 5, wherein the first comparator and the second comparator are combined in a characteristic diagram which determines an intermediate amount as a function of a change of the vehicle speed and of the position of the power control element.

7. An arrangement according to claim 6, further comprising a first order delay filter connected behind the characteristic diagram and according to a filtered intermediate quantity, the displacing device affecting the characteristic shifting diagram displaces the ratios as a function of the deviation in the direction of higher rotational engine speeds, the amount and the extent of the displacement rising as the intermediate quantity rises.

8. An arrangement according to claim 7, wherein the characteristic diagram is also a function of the adjusted ratio and the intermediate quantity is reduced before the filtering as the vehicle speed increases.

9. An arrangement for controlling an automatically shifting stepped transmission of a motor vehicle driven by an internal-combustion engine, comprising:

a first generator that determines a position of a power control element of the internal-combustion engine;

a second generator that determines rotational engine speed of the internal-combustion engine;

a plurality of characteristic shifting diagrams which cover a range between a consumption-optimal and a power-optimal operation of the internal-combustion engine and by which, at least as a function of the position of the power control element and of the rotational engine speed, ratios are automatically selected, said plurality of characteristic shifting diagrams differing in the position of the characteristic shifting curves at which a change of the ratio takes place;

means for determining the relationship of the position of the power control element to the reaction of the vehicle, said means including several characteristic diagrams of which one is used, in accordance with the adjusted ratio, for determination of an intermediate quantity as a function of a change of the vehicle speed and the position of the power control element;

means for multiplying the intermediate quantity with a factor which is a function of the driving speed and which continuously reduces the value of the intermediate quantity as the driving speed increases;

a first order delay line filter that filters said intermediate quantity; and means for selecting, for the displacement of the ratio, the characteristic shifting diagram to be used according to the filtered intermediate quantity, such that with an increasing intermediate quantity characteristic, shifting diagrams are selected which increasingly cover the power-optimal operation.

10. An arrangement for controlling an automatically shifting continuous transmission of a motor vehicle driven by an internal-combustion engine, comprising:

a first generator for determining the position of a power control element of the internal-combustion engine;

a second generator for determining the rotational engine speed of the internal-combustion engine;

a plurality of characteristic shifting diagrams which cover a range between a consumption-optimal and a power-optimal operation of the internal-combustion engine and by which, at least as a function of the position of the power control element and of the rotational engine speed, ratios are automatically selected;

means for determining a relationship of the position of the power control element to the reaction of the vehicle, said means including several characteristic diagrams of which one is used, in accordance with the adjusted ratio, for determination of an intermediate quantity as a function of a change of the vehicle speed and the position of the power control element;

means for multiplying the intermediate quantity with a factor which is a function of the driving speed and which continuously reduces the value of the intermediate quantity as the driving speed increases, a first order delay line filter which filters said intermediate quantity; and means for selecting, for the displacement of the ratio, the characteristic control curve to be used according to the filtered intermediate quantity, such that with an increasing intermediate quantity characteristic control curves are selected which increasingly cover the power-optimal operation.

* * * * *